(12) United States Patent
Lotter

(10) Patent No.: US 12,413,293 B2
(45) Date of Patent: Sep. 9, 2025

(54) SYSTEM AND METHOD FOR EQUALIZING OUTPUT POWER OF A REPEATER

(71) Applicant: Nextivity, Inc., San Diego, CA (US)

(72) Inventor: Michiel Petrus Lotter, San Diego, CA (US)

(73) Assignee: Nextivity, Inc., San Diego, CA (US)

( * ) Notice: Subject to any disclaimer, the term of this patent is extended or adjusted under 35 U.S.C. 154(b) by 328 days.

(21) Appl. No.: 18/217,964

(22) Filed: Jul. 3, 2023

(65) Prior Publication Data
US 2024/0007177 A1    Jan. 4, 2024

Related U.S. Application Data

(60) Provisional application No. 63/357,881, filed on Jul. 1, 2022.

(51) Int. Cl.
*H04B 7/155* (2006.01)

(52) U.S. Cl.
CPC ..... *H04B 7/15535* (2013.01); *H04B 7/15507* (2013.01)

(58) Field of Classification Search
None
See application file for complete search history.

(56) References Cited

U.S. PATENT DOCUMENTS

2015/0249557 A1*   9/2015   Dorman ............ H04L 25/03292
                                                                      375/233
2016/0295495 A1*   10/2016   Lotter ................ H04B 7/15507

\* cited by examiner

*Primary Examiner* — Frantz Bataille
(74) *Attorney, Agent, or Firm* — FisherBroyles LLP; James P. Cleary

(57) ABSTRACT

A repeater, and method of operating the same, for receiving and boosting signals from a plurality of mobile network operators. The repeater includes a donor antenna for receiving a composite signal that comprises separate signals from two or more of the plurality of mobile network operators, each of the separate signals having an amplitude. The repeater further includes an amplitude equalizer configured to equalize the amplitude of each of the separate signals of the composite signal, and an amplifier configured to boost the composite signal. The repeater further includes a server antenna for transmitting the boosted composite signal with the equalized separate signals.

20 Claims, 2 Drawing Sheets

SYSTEM AND METHOD FOR EQUALIZING OUTPUT POWER OF A REPEATER

BACKGROUND

Wireless repeaters may be used to boost signals, such as cellular signals, in order to resolve problems with poor coverage. One type of repeater is commonly referred to as a wideband repeater as this type of repeater has a passband that is typically wider than the bandwidth of the signal of one wanted signal. An example of where such a repeater may be used is in a cellular network where two or more mobile network operators may be transmitting signals in the same frequency band (e.g., 3GPP Band 1) and the signals from the two or more operators needs to be boosted.

FIG. 1 shows the basic structure of a wideband repeater 100. Actual implementations may vary. A signal is received from via the donor antenna 102. This signal is typically a composite signal received from a number of different mobile network operator signals. The input signals may be filtered using an input bandpass filter 104 after which the signals are amplified using a low-noise power amplifier 106. Following this initial amplification stage, one or more additional amplification stages 108 may be present to boost the signal to a specific level. The final signal may be filtered prior by filter 110 for transmission via the server antenna 112.

A fundamental problem with a wideband repeater is that any imbalance in the input signal levels from the different operators will be reflected in the output as well. This means that the smaller signal on the input will be the smaller signal on the output which in turns means that the coverage footprint that is created by the repeater for the mobile network operator with the smaller signal will be smaller than the coverage footprint created for the mobile network operator with the larger signal. This is in fact the opposite of the optimal outcome which would be that all operator signals at the output of the repeater should be similar in magnitude.

SUMMARY

This document describes a system and method for equalizing output power of a repeater. In one aspect, a repeater is described having a passband that is wider than the signal of a single mobile network operator and includes an amplitude equalizer and an amplitude equalizer control system. The amplitude equalizer control system receives information on the input signal strength of wanted signals and controls the amplitude equalizer to counteract the difference in input amplitude on the output of the repeater. The input information can be generated by cellular modem. In some implementations, the amplitude equalizer control system executes an adaptive amplitude equalizer algorithm to equalize the output power.

In some aspects, a repeater for receiving and boosting signals from a plurality of mobile network operators includes a donor antenna for receiving a composite signal that comprises separate signals from two or more of the plurality of mobile network operators, each of the separate signals having an amplitude. The repeater further includes an amplitude equalizer configured to equalize the amplitude of each of the separate signals of the composite signal, and an amplifier configured to boost the composite signal. The repeater further includes a server antenna for transmitting the boosted composite signal with the equalized separate signals.

In other aspects, a method of operating a repeater for receiving and boosting signals from a plurality of mobile network operators includes the steps of receiving, by a donor antenna, a composite signal that comprises separate signals from two or more of the plurality of mobile network operators, each of the separate signals having an amplitude. The method further includes the steps of equalizing the amplitude of each of the separate signals of the composite signal, and boosting the composite signal with equalized separate signals. The method further includes the step of transmitting, by a server antenna, the boosted composite signal with the equalized separate signals.

The details of one or more embodiments are set forth in the accompanying drawings and the description below. Other features and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This document describes a system and method for operating a repeater with a passband that is wider than the signal of a single mobile network operator. In some implementations, a system includes an Amplitude Equalizer and an Amplitude Equalizer Control System. The Amplitude Equalizer Control System receives information on the input signal strength of wanted signals and controls the Amplitude Equalizer to counteract the difference in input amplitude on the output of the repeater. In some implementations, the input information is generated by cellular modem. In yet other implementations, the Amplitude Equalizer Control System executes an adaptive amplitude equalizer algorithm.

In order to address the unbalanced coverage footprint, a system that automatically equalizes the various wanted signals within the passband is proposed. Such a system can include an adaptive amplitude equalizer processor, executing an adaptive amplitude equalizer algorithm.

Figure 1:
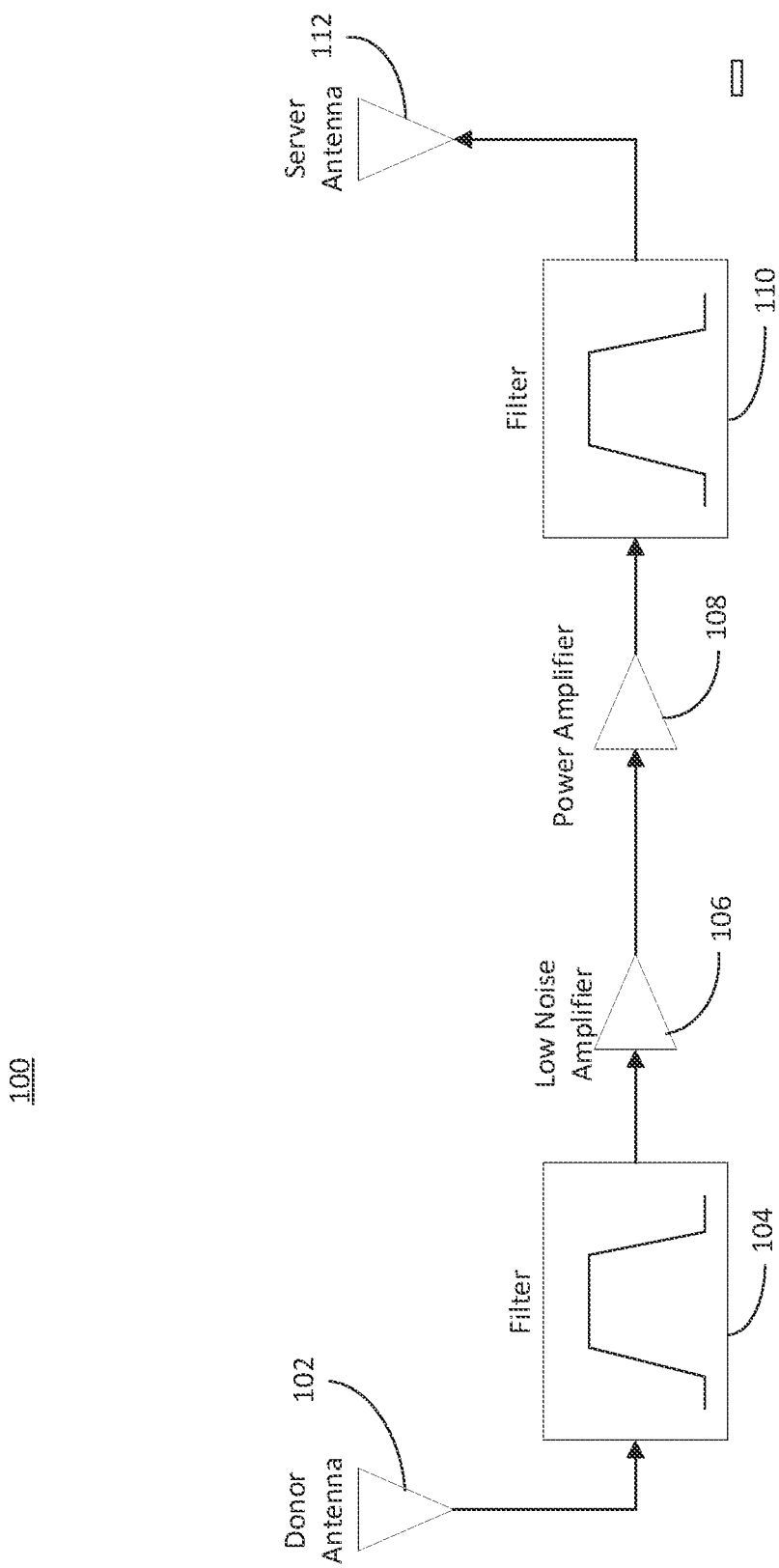
FIG. 1 depicts a basic structure of a wideband repeater.
Figure 2:
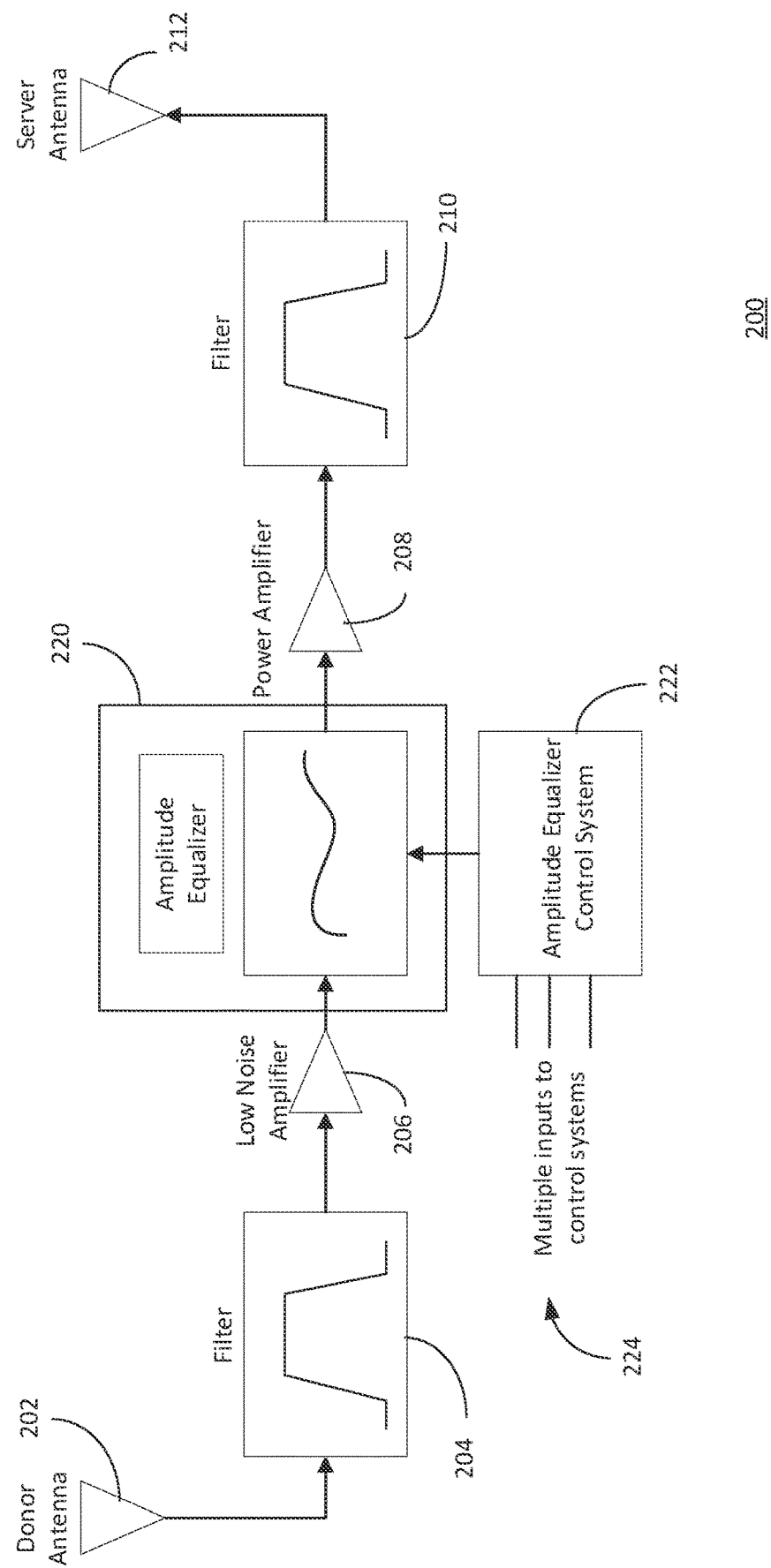
FIG. 2 illustrates a wideband repeater with amplitude equalizer and amplitude equalizer control system, in accordance with implementations of the current subject matter.

As shown in an example illustrated in FIG. 2, an amplitude equalizer 220 is inserted in the signal processing chain of a repeater 200. The repeater 200 includes a donor antenna 202, a bandpass filter 204, and a low-noise amplifier 206 to boost or amplify the filtered signal from bandpass filter 204. The signal can be a composite signal made up of two or more separate signals, each from a respective mobile network operator. The repeater 200 further includes one or more power amplifiers 208 to further boost or amplify the composite signal, a second filter 210, and a server antenna 212 for transmitting the filtered and boosted composite signal and its component separate signals.

In the example shown, an amplitude equalizer 220 is between the low noise amplifier 206 and the power amplifier(s) 208, but it may also be placed in other positions, or even distributed into multiple amplitude equalization blocks. The repeater 200 also includes an amplitude equalizer control system 222 that configures the amplitude equalizer 220 to counter the imbalance in the input signal so that the output signals from the various mobile network operators are roughly equal.

The amplitude equalizer 220 can be implemented in a number of different ways, including a bank of bandpass filters with variable gain, frequency/amplitude/bandwidth tunable bandpass filters, adaptive filters and other similar devices. The amplitude equalizer control system 222 can receive input signals on a variety of inputs 224 that it can use to determine the configuration of the amplitude equalizer 220, such as input signal strength of wanted input signals that make up the separate signals of the composite signal to be boosted before being transmitted by the server antenna 212.

Although a few embodiments have been described in detail above, other modifications are possible. Other embodiments may be within the scope of the following claims.

The invention claimed is:

1. A repeater for receiving and boosting signals from a plurality of mobile network operators, the repeater comprising
    a donor antenna for receiving a composite signal that comprises separate signals from two or more of the plurality of mobile network operators, each of the separate signals having an amplitude;
    an amplitude equalizer configured to equalize the amplitude of each of the separate signals of the composite signal;
    an amplifier configured to boost the composite signal; and
    a server antenna for transmitting the boosted composite signal with the equalized separate signals.

2. The repeater in accordance with claim 1, wherein the amplitude equalizer comprises a bank of bandpass filters with variable gain.

3. The repeater in accordance with claim 2, wherein the bank of bandpass filters includes one or more of a frequency, an amplitude, and a bandwidth tunable filter.

4. The repeater in accordance with claim 2, wherein the bank of bandpass filters includes at least one adaptive filter.

5. The repeater in accordance with claim 1, further comprising an amplitude equalizer control system configured for controlling the amplitude equalizer.

6. The repeater in accordance with claim 5, wherein the amplitude equalizer control system includes one or more inputs representing the amplitude of each wanted signal of the separate signals based on an input signal strength of the separate signals.

7. The repeater in accordance with claim 6, wherein the amplitude equalizer control system executes an adaptive amplitude equalizer algorithm based on the one or more inputs to equalize the amplitude of each of the separate signals.

8. The repeater in accordance with claim 1, further comprising an input bandpass filter between the donor antenna and the server antenna and configured to filter the composite signal.

9. The repeater in accordance with claim 1, further comprising a low-noise amplifier configured to amplify the filtered composite signal.

10. The repeater in accordance with claim 9, wherein the amplifier comprises the low-noise amplifier and one or more power amplifiers.

11. A method of operating a repeater for receiving and boosting signals from a plurality of mobile network operators, the method comprising
    receiving, by a donor antenna, a composite signal that comprises separate signals from two or more of the plurality of mobile network operators, each of the separate signals having an amplitude;
    equalizing the amplitude of each of the separate signals of the composite signal;
    boosting the composite signal with equalized separate signals; and
    transmitting, by a server antenna, the boosted composite signal with the equalized separate signals.

12. The method in accordance with claim 11, wherein the equalizing comprises applying a variable gain to each of the separate signals with a bank of bandpass filters.

13. The method in accordance with claim 12, wherein the bank of bandpass filters includes one or more of a frequency, an amplitude, and a bandwidth tunable filter.

14. The method in accordance with claim 12, wherein the bank of bandpass filters includes at least one adaptive filter.

15. The method in accordance with claim 11, further comprising controlling the amplitude equalizer using an amplitude equalizer control system, wherein the amplitude equalizer control system includes one or more inputs representing the amplitude of each wanted signal of the separate signals based on an input signal strength of the separate signals.

16. The method in accordance with claim 15, wherein the input signal strength represents the amplitude of each of the separate signals.

17. The method in accordance with claim 16, wherein the amplitude equalizer control system executes an adaptive amplitude equalizer algorithm based on the one or more inputs for equalizing the amplitude of each of the separate signals.

18. The method in accordance with claim 11, further comprising filtering the composite signal using an input bandpass filter between the donor antenna and the server antenna.

19. The method in accordance with claim 11, further comprising amplifying the filtered composite signal using a low-noise amplifier.

20. The repeater in accordance with claim 19, wherein the boosting comprises using the low-noise amplifier and one or more power amplifiers.

* * * * *